US006543697B1

(12) United States Patent
Imade et al.

(10) Patent No.: US 6,543,697 B1
(45) Date of Patent: Apr. 8, 2003

(54) INFORMATION RECORDING MEDIUM AND INFORMATION REPRODUCING APPARATUS

(75) Inventors: Shinichi Imade, Iruma (JP); Yutaka Yunoki, Kunitachi (JP); Hiroyoshi Fujimori, Hachiouji (JP); Shinzo Matsui, Uenohara-machi (JP); Takeshi Mori, Machida (JP); Hiroshi Sasaki, Hachiouji (JP)

(73) Assignee: Olympus Optical Co., Ltd., Tokyo (JP)

( * ) Notice: Subject to any disclaimer, the term of this patent is extended or adjusted under 35 U.S.C. 154(b) by 408 days.

(21) Appl. No.: 09/633,990

(22) Filed: Aug. 8, 2000

Related U.S. Application Data

(60) Continuation of application No. 09/145,103, filed on Sep. 1, 1998, which is a division of application No. 08/586,792, filed as application No. PCT/JP95/01050 on May 31, 1995, now Pat. No. 5,898,709.

(30) Foreign Application Priority Data

Jun. 2, 1994 (JP) .............................. 6-121368

(51) Int. Cl.[7] .............................. G06K 19/06
(52) U.S. Cl. ....................... 235/494; 235/454
(58) Field of Search ................ 235/494, 454, 235/456, 487

(56) References Cited

U.S. PATENT DOCUMENTS

| | | | | |
|---|---|---|---|---|
| 4,819,236 A | * | 4/1989 | Sako et al. ................ | 371/37.4 |
| 4,874,936 A | * | 10/1989 | Chandler et al. .......... | 235/494 |
| 4,924,078 A | * | 5/1990 | Sant'Anselmo et al. .... | 235/494 |
| 4,939,354 A | * | 7/1990 | Priddy et al. .............. | 235/494 |
| 4,998,252 A | * | 3/1991 | Suzuki et al. .............. | 371/37.5 |
| 5,038,660 A | * | 8/1991 | Watanabe .................... | 84/601 |
| 5,060,221 A | * | 10/1991 | Sako .......................... | 369/59 |

(List continued on next page.)

FOREIGN PATENT DOCUMENTS

| | | |
|---|---|---|
| JP | 60-103486 | 6/1985 |
| JP | 63-276943 | 11/1988 |
| JP | 03-11482 | 1/1991 |
| JP | 03-127341 | 5/1991 |
| JP | 05-109068 | 4/1993 |

OTHER PUBLICATIONS

Copy of Office Action dated Mar. 28, 2002 issued in counterpart Korean Patent Application No. 10–1996–0700564 and English translation thereof.
European Office Action dated Sep. 11, 2001 issued in related European Application Serial No. 95 920 218.5–2210.
Van der Meer, "The Full Motion System for CD–I", IEEE Transactions on Consumer Electronics, vol. 38, No. 4, Nov. 1992, pp. 910–920.
Yoshida, "The Rewritable MiniDisc System", Processdings of the IEEE, vol. 82, No. 10, Oct. 1994, pp. 1492–1500.
van der Meer, "The Full Motion System for CD–I", IEEE Transactions on Consumer Electronics, vol. 38, No. 4, Nov., 1992, pp. 910–920.*
Yoshida, "The Rewritable MiniDisc System", Processings of the IEEE, vol. 82, No. 10, Oct. 1994, pp. 1492–1500.*

(List continued on next page.)

Primary Examiner—Thien M. Le
Assistant Examiner—U Chan Le
(74) Attorney, Agent, or Firm—Frishauf, Holtz, Goodman & Chick, P.C.

(57) ABSTRACT

An information recording (transmission) medium (30) has code pattern printed and recorded thereon, containing processing information necessary to subject data to edit processing in accordance with a reproduction process for reproducing, to original multimedia information, a dot pattern which is read out from the information recording medium. A multimedia paper (MMP) reproduction apparatus (28) as the information reproducing apparatus performs data processing based on the processing information.

18 Claims, 7 Drawing Sheets

U.S. PATENT DOCUMENTS

| | | | | |
|---|---|---|---|---|
| 5,126,542 A | * | 6/1992 | Priddy et al. | 235/494 |
| 5,324,923 A | * | 6/1994 | Cymbalski et al. | 235/494 |
| 5,329,107 A | * | 7/1994 | Priddy et al. | 235/494 |
| 5,343,031 A | * | 8/1994 | Yoshida | 235/494 |
| 5,416,760 A | * | 5/1995 | Masood et al. | 369/47 |
| 5,464,974 A | * | 11/1995 | Priddy et al. | 235/494 |
| 5,468,953 A | * | 11/1995 | Priddy et al. | 235/494 |
| 5,473,151 A | * | 12/1995 | Priddy et al. | 235/494 |
| 5,477,045 A | * | 12/1995 | Priddy et al. | 235/494 |
| 5,479,004 A | * | 12/1995 | Priddy et al. | 235/494 |
| 5,484,999 A | * | 1/1996 | Priddy et al. | 235/494 |
| 5,559,608 A | * | 9/1996 | Kunihiro | 358/343 |
| 5,568,555 A | * | 10/1996 | Shamir | 380/51 |
| 5,754,687 A | * | 5/1998 | Fujimori et al. | 382/190 |
| 5,774,583 A | * | 6/1998 | Sasaki et al. | 382/190 |
| 5,860,679 A | * | 1/1999 | Fukuda et al. | 283/70 |
| 5,896,403 A | | 4/1999 | Nagasaki et al. | 371/37.1 |
| 5,898,709 A | * | 4/1999 | Imade et al. | 371/40.11 |
| 5,920,661 A | * | 7/1999 | Mori et al. | 382/317 |
| 5,951,056 A | * | 9/1999 | Fukuda et al. | 283/93 |

OTHER PUBLICATIONS

Van der Meer, "The Full Motion System for CD–I", IEEE Transactions on Consumer Electronics, vol. 38, No. 4, Nov. 1992, pp. 910–920.

Yoshida, "The Rewriteable MiniDisc System", Proceedings of the IEEE, vol. 82, No. 10, Oct. 1994, pp. 1492–1500.

* cited by examiner

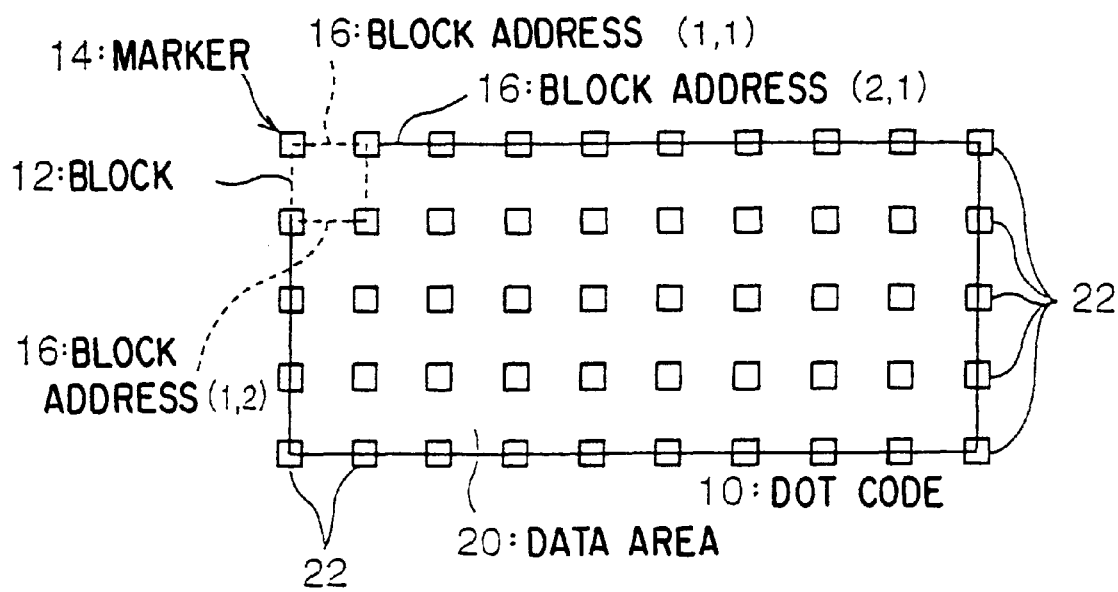
F I G. 1A
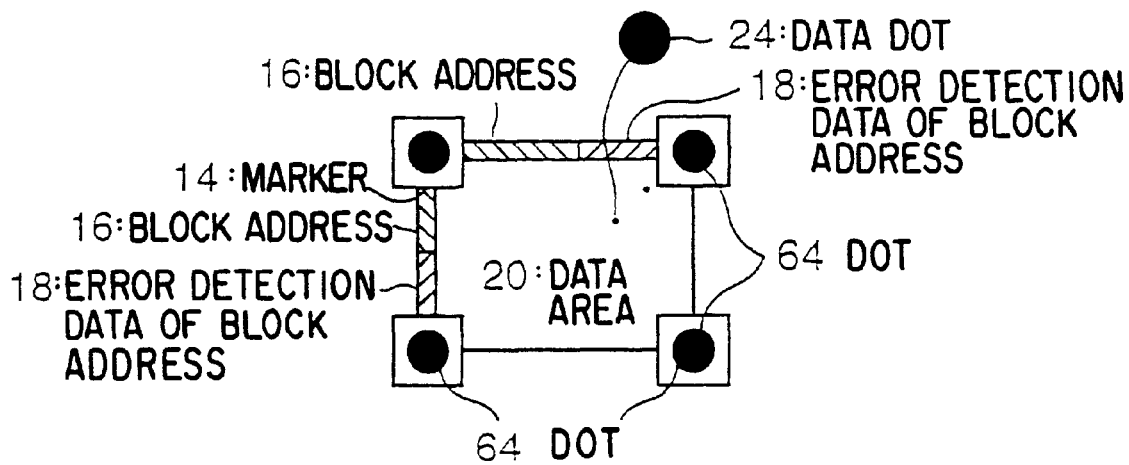
F I G. 1B

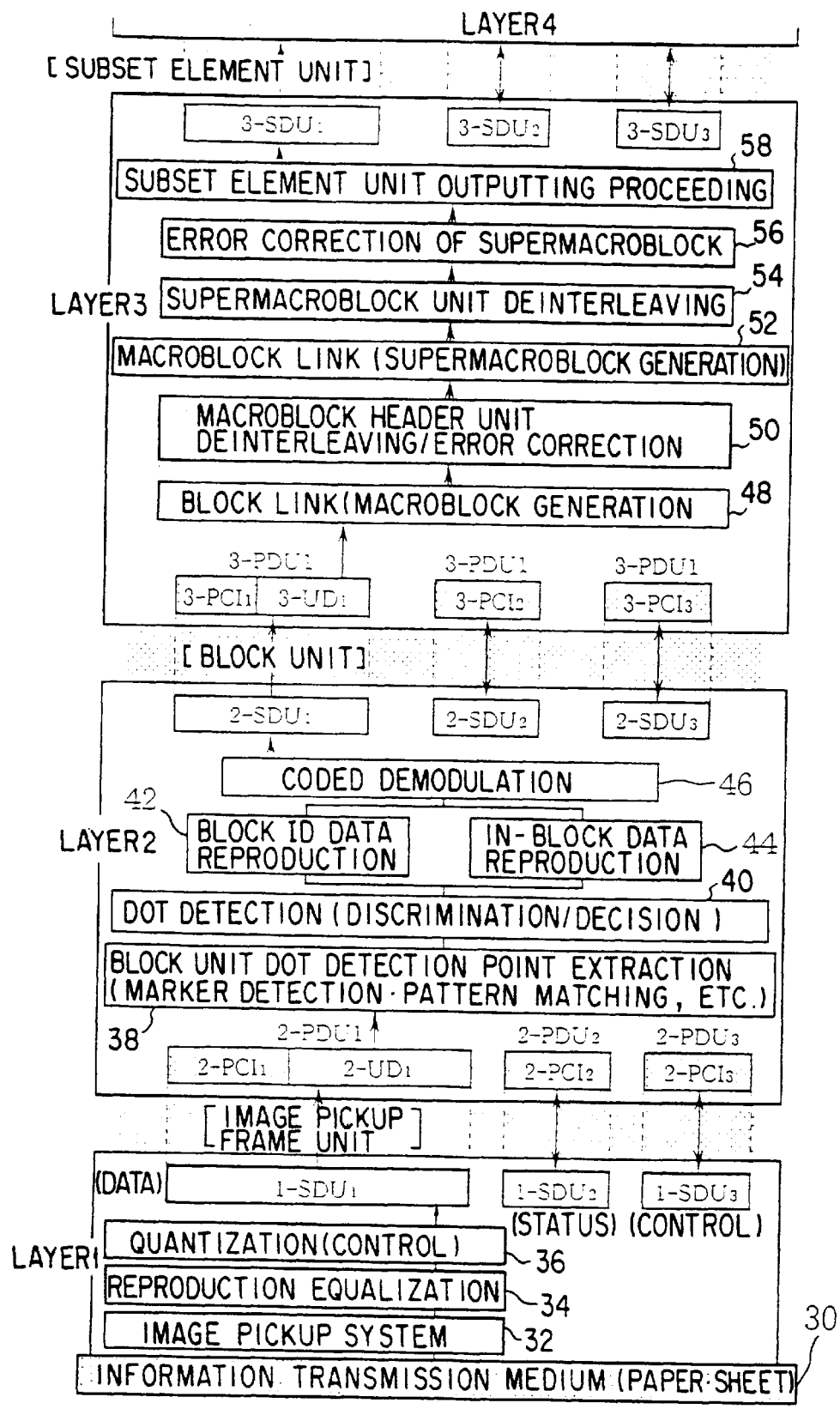
F I G. 3A

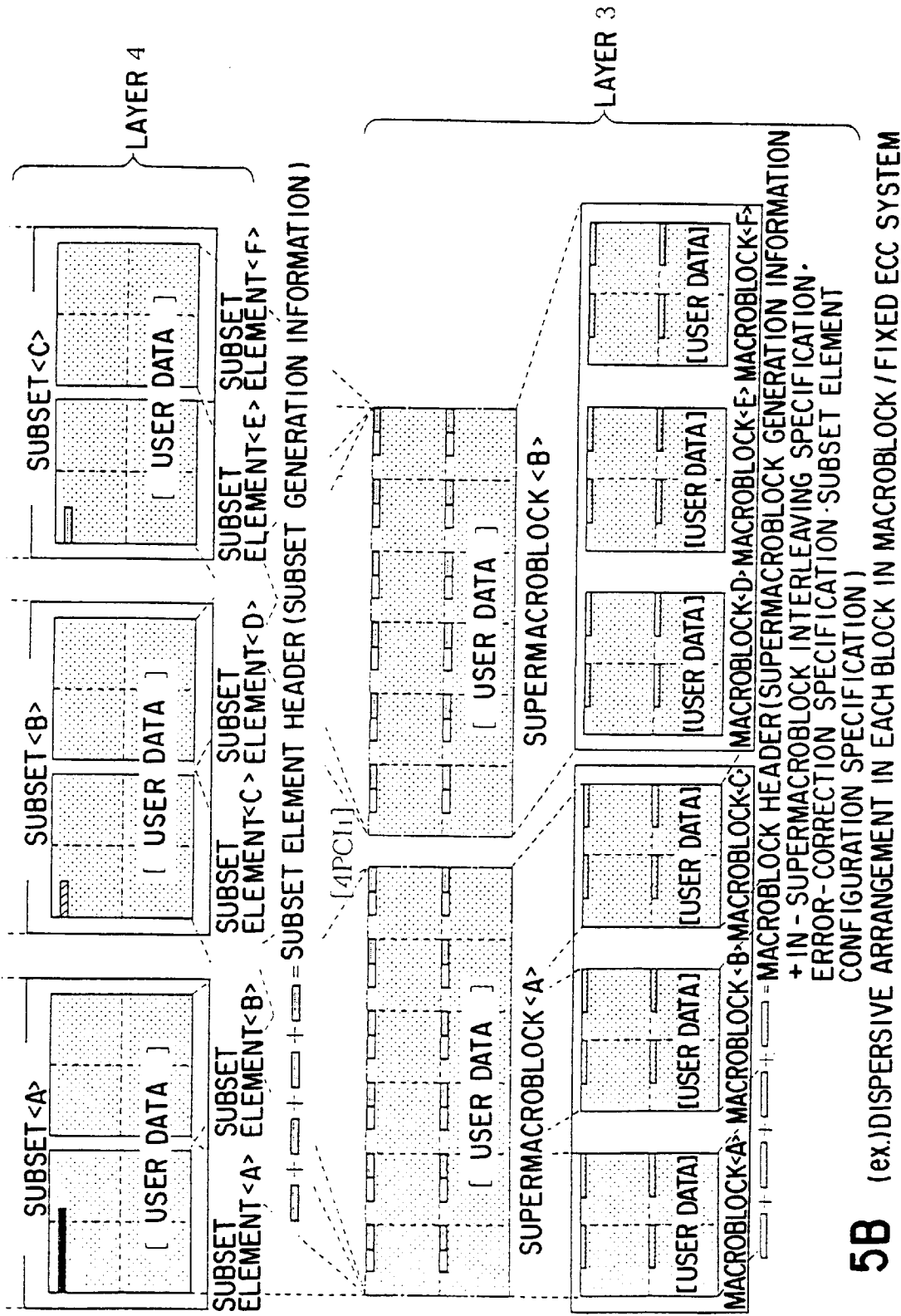
FIG. 5B (ex.) DISPERSIVE ARRANGEMENT IN EACH BLOCK IN MACROBLOCK / FIXED ECC SYSTEM

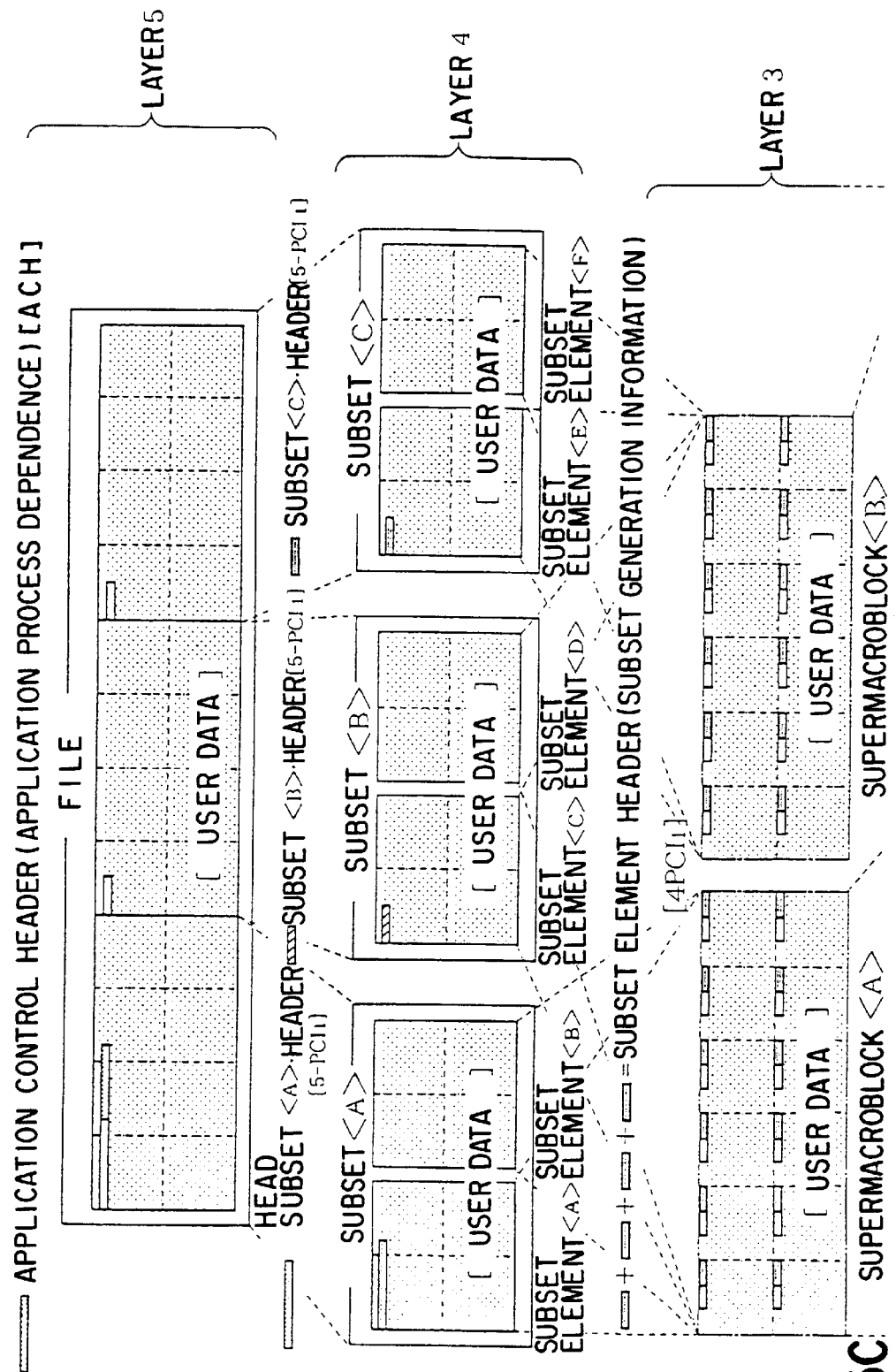
F I G. 5C

INFORMATION RECORDING MEDIUM AND INFORMATION REPRODUCING APPARATUS

This is a continuation, application Ser. No. 09/145,103 filed Sep. 1, 1998, which is a Division of application Ser. No. 08/586,792 filed Feb. 1, 1996, now U.S. Pat. No. 5,898,709 filed May 31, 1995 which is a 372 of PCT/JP95/01050.

TECHNICAL FIELD

The present invention relates to an information recording medium, such as paper, recording, as an optically readable code pattern, so-called multimedia information including, for example, audio information such as a speech and music, video information obtained from a camera, a video device, etc., and digital code data obtained from a personal computer, a word processor, etc., and an information reproducing apparatus optically reading out a code pattern recorded on such an information recording medium and reproducing its original multimedia information.

BACKGROUND ART

Various media, such as a magnetic tape, an optical disc, etc., have been conventionally known as media for recording speech, music, etc. These media, being manufactured in large quantities, become higher in unit cost and occupy greater space. Further, if there arises the need to send a speech-recorded medium to a person in a far-away place or places, it takes more time and trouble even if it is mailed to him or her or it is carried with him or her in person. The same to thing can also be true about so-called multimedia information including, in addition to audio information, video information obtained from a camera, video device, etc., as well as digital code data obtained from a personal computer, word processors, etc.

The applicant has conceived a system for recording multimedia information containing at least one of audio information, video information and digital code data, in dot-code form, on an information recording medium such as paper, that is, the multimedia information as image information, i.e., coded information, capable of facsimile transmission and of copying in large quantities at low cost and a system for reproducing such recorded multimedia information and filed the invention as an international application PCT/JP93/01377 (WO 94/08314).

In the information reproducing system of this international application, the information reproducing apparatus is adapted to achieve reproduction operation by optically reading out the dot code from the information recording medium and adapted to achieve read-out operation by manually scanning the recorded medium along the recorded dot code while carrying the apparatus by hand.

The dot code pattern per se is now under investigation to improve the recording density and the information recording medium and information reproducing apparatus filed under the above international application have not been fully considered in terms of their flexibility and versatility on a future change or modification.

DISCLOSURE OF INVENTION

It is accordingly the object of the present invention to provide an information recording medium and information reproducing apparatus which, even if the configuration of a code pattern itself varies in the future, can cope with this situation.

In order to achieve the above-mentioned object, there is provided an information recording medium having an area recording, as an optically readable code pattern, multimedia information containing at least one of audio information, video information and digital code data, characterized in that the code pattern contains processing-information necessary to subject the data to edit processing in accordance with a reproduction process for reproducing original multimedia information by reading out the code pattern.

Or an information recording medium of the present invention has an area recording, as an optically readable code pattern, multimedia information containing at least one of audio information, video information and digital code data, characterized in that reproducing means, adapted to be applied to the information recording medium, for reading out the code pattern and for reproducing the code pattern to original multimedia information, at least comprises: first layer processing means for converting the read-out code pattern to code data as an image and for delivering an output with information related to the read-out attached as first processing information to the code data; second layer processing means for recognizing the first processing information delivered from the first layer processing means and processing the code data delivered from the first layer processing means and for creating a block with the code data and delivering an output; third layer processing means for allowing second processing information at least necessary to form a supermacroblock of a greater given unit through the gathering of such blocks output from the second layer processing means to be extracted from the code data of the block, recognizing the second processing information and creating the supermacroblock based on the second processing information, for allowing third processing information for error handling-related processing to be extracted from the supermacroblock, recognizing the third processing information and performing the processing related to the error handling of the supermacroblock on the basis of the third processing information, and for outputting a subset element created through dispersion of the supermacroblocks on the basis of the third processing information; and fourth layer processing means for allowing fourth processing information at least necessary to create a subset comprised of a code of a given unit, from which the multimedia information is reproducible, to be extracted from the subset element which is delivered from the third layer processing means and outputting the subset created on the basis of the fourth processing information, and that the code pattern contains the second to fourth processing information.

Or an information reproducing apparatus of the present invention comprises reproducing means for optically reading out a code pattern from an information recording medium having an area recording, as the optically readable code pattern, multimedia information containing at least one of audio information, video information and digital code data, and reproducing the code pattern back to original multimedia information, characterized in that the reproducing means includes means for performing data processing based on processing information necessary to subject data to edit processing in accordance with a reproduction process contained in the code pattern.

Or an information reproducing apparatus of the present invention comprises reproducing means for optically reading out a code pattern from an information recording medium having an area recording, as an optically readable code pattern, multimedia information containing at least one of audio information, video information and digital code data and reproducing the code pattern back to original multimedia information, characterized in that the code pattern contains processing information necessary to subject data to edit processing in accordance with a reproduction process of reproducing the read-out code pattern to original multimedia information, and that the reproducing means includes means for generating data of a second given unit by gathering, in predetermined numbers, data in each first given unit and structuring such data based on the processing information.

Or an information reproducing apparatus of the present invention comprises reproducing means for optically reading out a code pattern from a recording medium having an area recording, as the optically readable code pattern, multimedia information containing at least one of audio information, video information and digital code data and for reproducing the pattern back to original multimedia information, characterized in that the reproducing means includes means for extracting processing information necessary to subject data to edit processing in accordance with the reproduction process at multiple stages from that data at a stage previous to a stage involved.

Or an information reproducing apparatus of the present invention comprises reading-out means for optically reading out a code pattern from a recording medium having an area recording, as the optically readable code pattern, multimedia information containing at least one of audio information, video information and digital code data, reproducing means for reproducing the code which is read out by the reading-out means back to original multimedia information, and outputting means for outputting the multimedia information reproduced by the reproducing means, characterized in that the reproducing means comprises: first layer processing means for converting the read-out code pattern to code data as an image and for delivering an output with information related to the read-out attached as first processing information to the code data; second layer processing means for recognizing the first processing information delivered from the first layer processing means and processing the code data delivered from the first layer processing means and for creating a block with the code data gathered and for delivering an output; third layer processing means for allowing second processing information at least necessary to form a supermacroblock of a greater given unit through the gathering of such blocks output from the second layer processing means to be extracted from the code data of the block, recognizing the second processing information and creating the supermacroblock based on the second processing information, for allowing third processing information for error handling-related processing to be extracted from the supermacroblock, recognizing the third processing information and performing processing related to the error handling of the supermacroblock on the basis of the third processing information, and for outputting a subset element created through the dispersion of the supermacroblocks on the basis of the third processing information; and fourth layer processing means for allowing fourth processing information at least necessary to create a subset comprised of a code of a given unit, from which the multimedia information is reproducible, to be extracted from the subset element which is delivered from the third layer processing means and for outputting the subset created on the basis of the fourth processing information.

That is, according to the information recording medium and information reproducing apparatus of the present invention, the optically readable code pattern recorded is of such a type that it contains processing information necessary to subject data to edit processing in accordance with a reproduction process for reproducing read-out code pattern back to original multimedia information and the reproducing means includes means for performing data processing based on the processing information necessary to subject data to edit processing. It is, therefore, possible to select the processing method or processing parameters in plural numbers and, even if the structure of the code pattern per se is varied in the future, cope with this situation.

Or according to the information recording medium and information reproducing apparatus of the present invention, the first layer processing means of the reproducing means converts the read-out code pattern to code data and delivers an output with first processing information attached thereto, the second layer processing means recognizes the first processing information, processes the code data and generates a block as an output, the third layer processing means extracts second and third processing information from the code data of the block, recognizes it and generates a supermacroblock based on the second processing information and performs processing related to error handling of the superblock on the basis of the third processing information. Further, it separates such supermacroblocks based on the third processing information and generates a subset element as an output and the fourth layer processing means extracts fourth processing information from the subset element and, based thereon, generates a subset as an output. Since the code pattern contains the second to fourth processing information, various processings can freely be selected by the second through the fourth processing information in the code pattern and, even if the configuration of the code pattern per se is varied in the future, it is possible to cope with this situation.

Further, according to the information reproducing apparatus of the present invention, the code pattern is of such a type as to contain processing information necessary to subject data to edit processing in accordance with a reproduction process for reproducing a read-out code pattern back to original multimedia information. The reproducing means generates data in a second given unit by gathering, in predetermined numbers, data corresponding to the code pattern read out based on the processing information and structuring it. Therefore, a supermacroblock as the second given unit can be generated without depending upon the order in which the data of the block in the first given unit is obtained. It is possible to freely set the read-out scanning direction of a dot pattern as the code pattern. Even if, therefore, the configuration of the code pattern per se is varied in the future, it is possible to cope with this situation.

Or, according to the information reproducing apparatus of the present invention, the reproducing means extracts processing information necessary to subject data to edit processing in accordance with the reproduction process at multiple stages from data from the previous stage. It is, therefore, only necessary to know a configuration of the existing position, etc., of processing information necessary to obtain requisite minimal processing information in data. Even if the configuration of the code pattern per se is varied in the future, it is possible to cope with this situation.

BRIEF DESCRIPTION OF DRAWINGS

FIGS. 1A and 1B are views showing formats of a dot code;

BEST MODE FOR CARRYING OUT THE INVENTION

Figure 2:
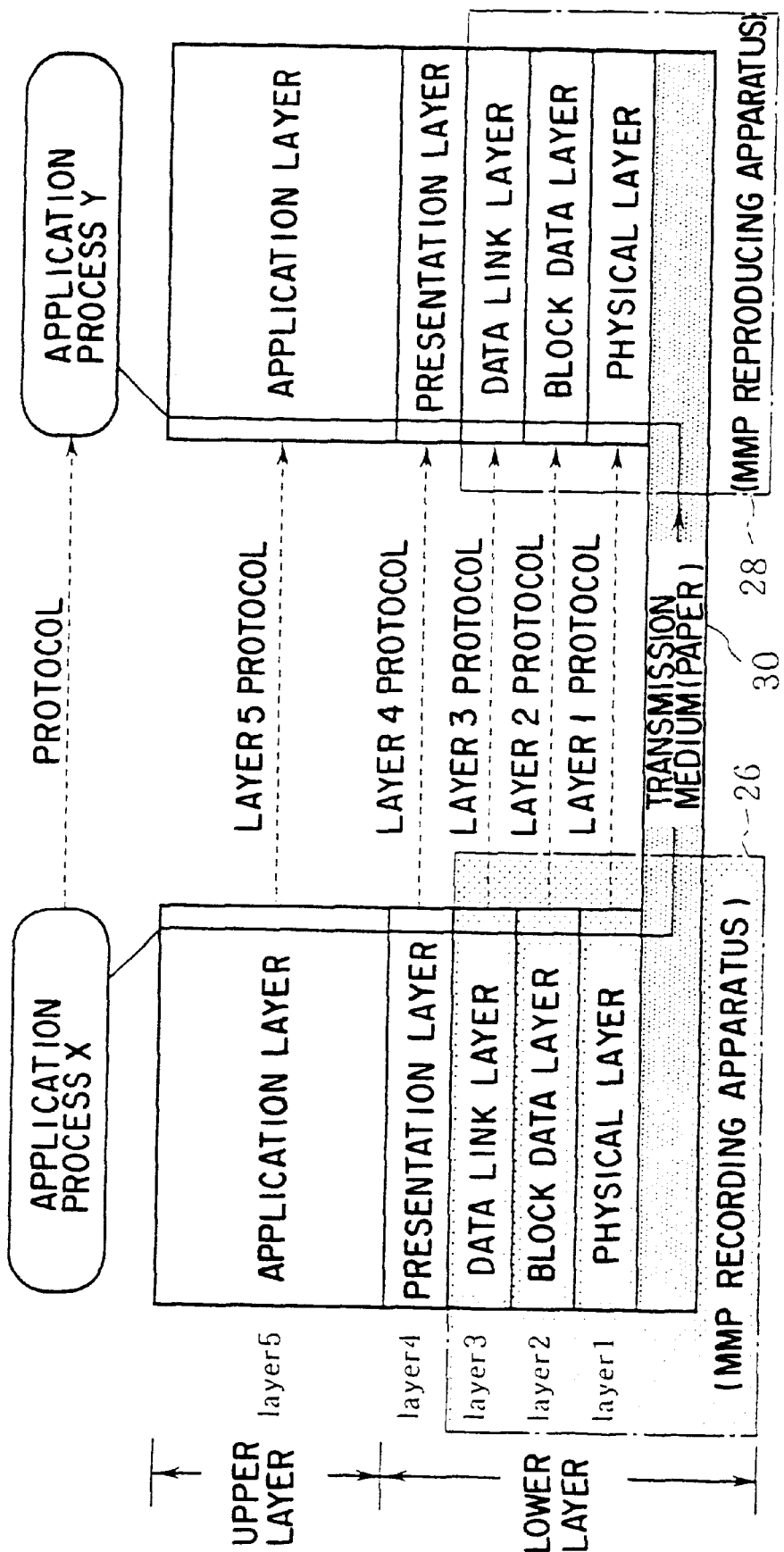
FIG. 2 is a view showing a practical layer division structure for an information transfer protocol in a multimedia paper system.

Before explaining the embodiment of the present invention, explanation will be given below about a code pattern of such a dot code as set out in detail in the international application number PCT/JP93/01377 (WO 94/08314) filed by the applicant, in order to more understand the nature of the present invention.

As shown in FIGS. 1A and 1B, a dot code 10 comprises an array of blocks 12 each having a plurality of dots arranged in accordance with the content of data, that is, blocks 12 grouped together and each comprised of data per given unit. One block 12 comprises a marker 14, a block address 16 and an address error detection data 18 as well as a data area 20 where actual data is entered.

The respective blocks constituting the dot code 10 are arranged as a two-dimensional array and each is given a block address 16. The block addresses 16 correspond to X and Y addresses. Given that the left most top block in FIG. 1A corresponds to X and Y addresses=(1, 1), the next adjacent block corresponds to (2, 1) and, in this way, the X address is incremented by 1 toward the right direction and the Y address by 1 toward the bottom in FIG. 1A for example. In this way, the respective addresses 16 are added to all the blocks 12.

Here, the lowest and rightmost stage markers are given dummy markers 22. That is, the block 12 corresponding to a given marker 14 represents the diagonal right lower data of a boundary surrounded with four markers 14 including the given marker 14 and the lowest and rightest stage markers represent auxiliary markers, that is, dummy markers 22, so arranged as to define those blocks corresponding to the second stage markers from the bottom and second stage marker from the right.

Then the content of the block 12 will be explained below. As seen from FIG. 1B, the block address 16 and its error detection code 18 are attached between the marker 14 of a given block 12 and its lower marker. Further, a block address 16 and its error detection code 18 are similarly attached between the marker 14 of the given block 16 and its right-side market. In this way, the block addresses 16 are arranged on the left side and upper side of the data area 20 and the marker 14 is arranged on the left upper side. Although the block address 16 has been explained as being recorded at two places in one block, it may be recorded at one place. If the block address is so recorded at two places and, in this case, noise is produced at one of the two block addresses to cause an error, then positive detection can be made through the detection of the other address. It is, therefore, preferable to record the block address at two places.

Through the use of the above-mentioned two-dimensional block division system, those adjacent four markers are detected on the information reproducing apparatus side and normalization is effected by dividing a marker-to-marker space into equal dot parts. This structure is robust against scaling, deformation, etc., and against of a hand.

It is to be noted that a data dot 24 in the data area 20 is, for example, a few tens of $\mu$m, Depending upon the application and usage, the dot size can be made at a level of a few $\mu$m and, usually, 40 $\mu$m, 20 $\mu$m or 80 $\mu$m. The data area 20 is so dimensioned as to be, for example, 64×64 dots. These can be freely expanded or contracted to a range over which an error by the equal division method can be absorbed. Further, the above-mentioned marker 14 functions as a position marker and has a size not possessed by modulated data, for example, a circular block marker of 7×7 dots in diameter. The block address 16 and error detection data 18 are formed by dots similar to the data dots 24.

One embodiment of the present invention will be explained below with reference to the accompanying drawings.

FIG. 2 is a practical layer division form of an information transfer protocol in a multimedia paper (MMP) system for recording on, and reproducing from, an information recording medium, such as paper, a dot code pattern which is as one example of a code pattern allowing the multimedia information as set out above to be optically read out. Here, each of the layers (N=1 to 5) are intended to embody an operation protocol for performing a function necessary for the layer N to respond to a request from an adjacent layer.

The recording side and reproducing side each have a logical layered-structure of layers 1 to 5.

On the recording side, the so-called multimedia information produced in an application process X, normally through an application program in a computer, and containing audio information such as speech and music, video information obtained from a camera and video device and digital code data obtained from a personal computer and word processor are transferred to an MMP recording device 26 as an information recording device through an application layer (layer 5) and presentation layer (layer 4) created on the computer. In the MMP recording device 26, the received data is printed/recorded, by a data link layer (layer 3), block data layer (layer 2) and physical layer (layer 1), on the information recording (transmission) medium 30, such as paper, as an optically readable dot code pattern.

The information recording (transmission) medium 30 is passed to the reproduction side or the code pattern recorded on the medium 30 is facsimile-transmitted to the reproducing side and also can be printed/recorded on an information recording medium 30 on the reproducting side.

On the MMP reproducting apparatus 28, the code pattern on the information recording medium 30 is picked up and, through a process reverse to that on the recording time, that is, a reproduction process from the layer 1 to the layer 3 or the layer 5, the data is subjected to edit processing and result data is passed to the reproducting side. On the reproducing side, through the reverse process past the layers 4 and 5 if the necessity arises, reproduced multimedia information is passed to the application process Y.

Now detailed explanation will be given below of the respective layers (layered-structure) on the reproducing side and those layers on the recording side are omitted since the recording side is reverse to the reproducing side in process.

First, the layer 1 (physical layer) has a basic role to ensure positive transmission of quantized data of the dot image. The layer 1 defines electrical/physical conditions and various quantizing conditions (that is, the simple transfer regulations, equalization system, etc., of the dot pattern). The layer function required of the layer 1, that is, the service offered, can contain the providing of transmission media (kinds of paper) in plural numbers, allowance of a multidot density, providing of scanner image resolutions, providing of a plurality of transmitting means for video signals, providing of a read start/end function, etc., and, if the necessity arises, can contain the multi-gradation representation (binary, multi-valued) of dots, allowance of multi-dot representation (the taking of a color image, transmission), etc.

The layer 2 (block data layer) has a basic role of positively transmitting blocks and bit strings in a block. The layer 2 defines various conditions for block transmission (that is, the block detection system, channel bit detection system, code modulation/demodulation system, etc.). The layer function required of the layer 2, that is, the service provided, includes the extraction of blocks and detection of dot sample points, providing of the plural-recording system (providing of the binary, multi-valued, multiplex systems, etc.), providing of the multi-block pattern, providing of a multi-coded modulation/demodulation system, detection of the block relative position, notice of the block detection error and defect overcoming operations, etc. Here it is to be noted that the providing of the multi-block pattern contains the block size detection function, mark definition/detection function, taking of the multi-dot reading order, etc.

The layer 3 (data link layer) has a basic role of ensuring the generation and positive transmission of a given data mass (subset element (fourth predetermined unit)) of a given ensured error quality. The layer 3 defines the condition of linking the block data (first given unit), various conditions generating a macroblock (third given unit)/supermacroblock (second given unit), that is, an interleaving system/structure, (super) macroblock header and user data error control (that is, ECC system/structure) and so on. The layer function required of the layer 3, that is, the service offered, contains the providing of the block address read/write abnormality recovery function, confirmation of a desired block read-out state (checking of a read-effective block), setting of the block array structure, creation of the intermediate data mass, providing of the interleaving system/scope/structure in plural numbers, providing of the ECC system/scope/structure in plural numbers, and so on.

The layer 4 (presentation layer) has a basic role of ensuring the creation of the subset. The layer 4 defines various conditions of linking the subset element and creating the subset. The layer function required of the layer 4, that is, the service offered contains the picking/rejecting of the subset element required of an object file, creation of the subset and determining of its condition, bit data conversion for DOS, and so on. Here, the subset means perceptible information unit data. That is, the above-mentioned macroblock and supermacroblock contain the multimedia information such as sound and pictures and are referred to as data blocks called as the subsets, that is, those data blocks perceptible as one information unit such as sound information if sounds are grouped as such and picture information of pictures as such.

The layer 5 (application layer) has a basic role for ensuring positive, better file management. This layer 5 defines various conditions for making file management such as the file creation conditions. The layer function required of the layer 5, that is, the service offered contains the filing of the application request or the reading/writing of the subsets.

The application process has a basic role of implementing the application utilizing the MMP system. The application process contains the shuffling system/structure of the source sample data, scrambling system/structure of coding, data compression system/structure, sound-text-image data structure, and so on. The function required of the application process, that is, the service offered contains the providing of the source sample data shuffling system, providing of the scrambling system and so on and, if the necessity arises, providing of the data compression system-compression/expansion operation in plural numbers, recognition of information species and selection of the data structure and so on.

Figure 3B:
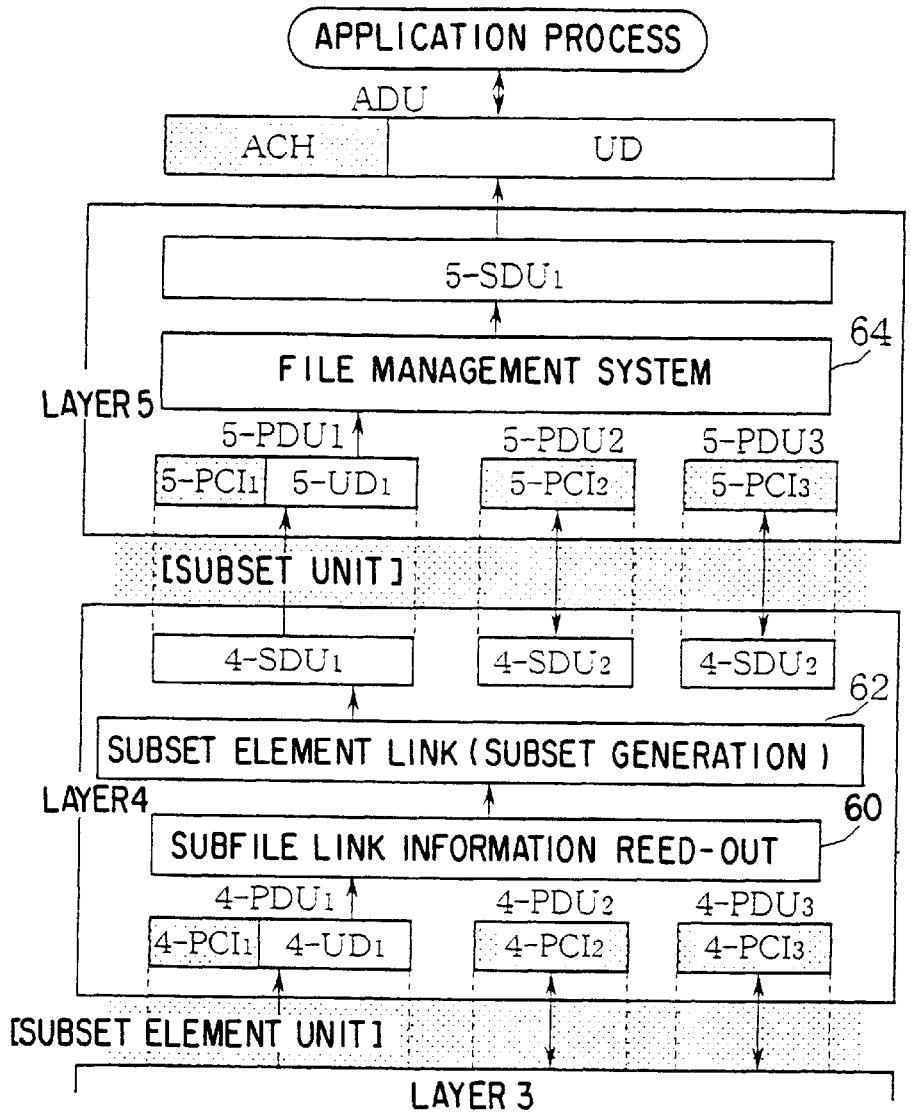
FIG. 3A shows a practical form of the lower layers in a layer structure on a reproducing side and FIG. 3B a practical form of the upper layers.

FIGS. 3A and 3B show a multi-stage process on a multi-layered structure on the reproducing side.

In these Figures, N-SDUn represents Nth layer service data unit, No.n; N-PDUn, Nth layer protocol data unit, No.n; N-PCIn, Nth layer protocol control information, No.n (corres. to various processing information in the present invention); N-UDn, Nth layer user data, No.n; ADU; application data unit; and ACH, application control header, where n=1 denotes data; 2, a status; and 3, control information.

Figure 4:
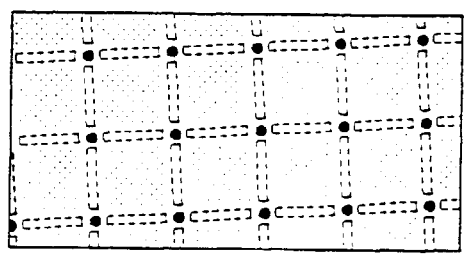
FIG. 4 is a view showing a picked-up dot code image.

The layer 1, that is, the physical layer has a function module (image pickup system module 32) allowing a dot code pattern which is recorded on the information recording (transmission) medium 30 such as paper to be optically picked up as shown in FIG. 4 and outputting an image signal and a function module (reproduction equalization module 34, quantization module 36) subjecting an image signal to pre-processing (gain control, equalize processing) and to a sample/quantize processing. The layer further has a function module converting a quantized value to digital data and creating image data, a function module structuring the image data to obtain a predetermined data format comprising structure information (header, that is, the first processing information) and data (entity of the image data) and delivering an output to the adjacent upper layer, that is, the layer 2, and a function module effecting the inputting/outputting of process-related status information and control information.

Image pickup frame unit structuring (image) data is passed as the service data unit ($1\text{-}SDU_1$) from the layer 1 to the upper layer 2.

The layer 2, that is, the block data layer has a function module receiving structured (image) data ($1\text{-}SDU_1$) as $2\text{-}PDU_1$ from the adjacent lower layer, that is, the layer 1, separating structured information ($2\text{-}PCI_1$, that is, first processing information) and data entity ($2\text{-}UD_1$) while recognizing them, and converting the data entity to a form fit for processing; a function module processing the data entity converted to a process-fit form and extracting a plurality of blocks divided in a given information code unit, the function module comprising a block unit dot detection point extracting (marker detection, pattern matching, etc.) module 38 and dot detecting (discriminating/determining) module 40; and a function module processing extracted block and reproducing a block unit information code, the function module comprising a block ID data reproducing module 42 and in-block data reproducing module 44. Here, the block unit information code comprises structured information for connecting together a plurality of blocks, coded modulation information and data entity. Further, the layer 2 has a functional module (coded demodulation module 46) reading out the coded modulation information from the block unit information and demodulating the data entity in accordance with the coded modulation information, function module outputting, as a $2\text{-}SDU_1$, structured information (block header, that is, second processing information) and data entity (user data) to the adjacent upper layer, that is, the layer 3, and function module for inputting and outputting processing-related status information and control information, etc.

That is, the layer 2 detects a block unit dot detection point, that is, a marker from the image data for each block data of a first given unit, detects the data dot in a block unit in accordance with the detected marker and gets it back to data in a bit string. The detail of this processing is disclosed in the international application PCT/JP93/01377 filed by the applicant. With respect to the data in the block unit, first the header, that is, block ID data, is reproduced, the in-block data is reproduced as user data and, after coded demodulation, it is passed as the data in the block unit to the upper layer, that is, the layer 3.

The layer 3, that is, the data link layer has a function module (block link (macroblock generation) module 48) receiving, as 3-PDU$_1$, a blocked information code (2-SDU$_1$) from the adjacent lower layer, that is, the layer 2, recognizing and reading out structured information (3-PCI$_1$, that is, second processing information) from it and linking a plurality of block unit data entities (3-UD$_1$) in accordance with the structured information to generate (building up) a macroblock or a supermacroblock.

Figure 5A:
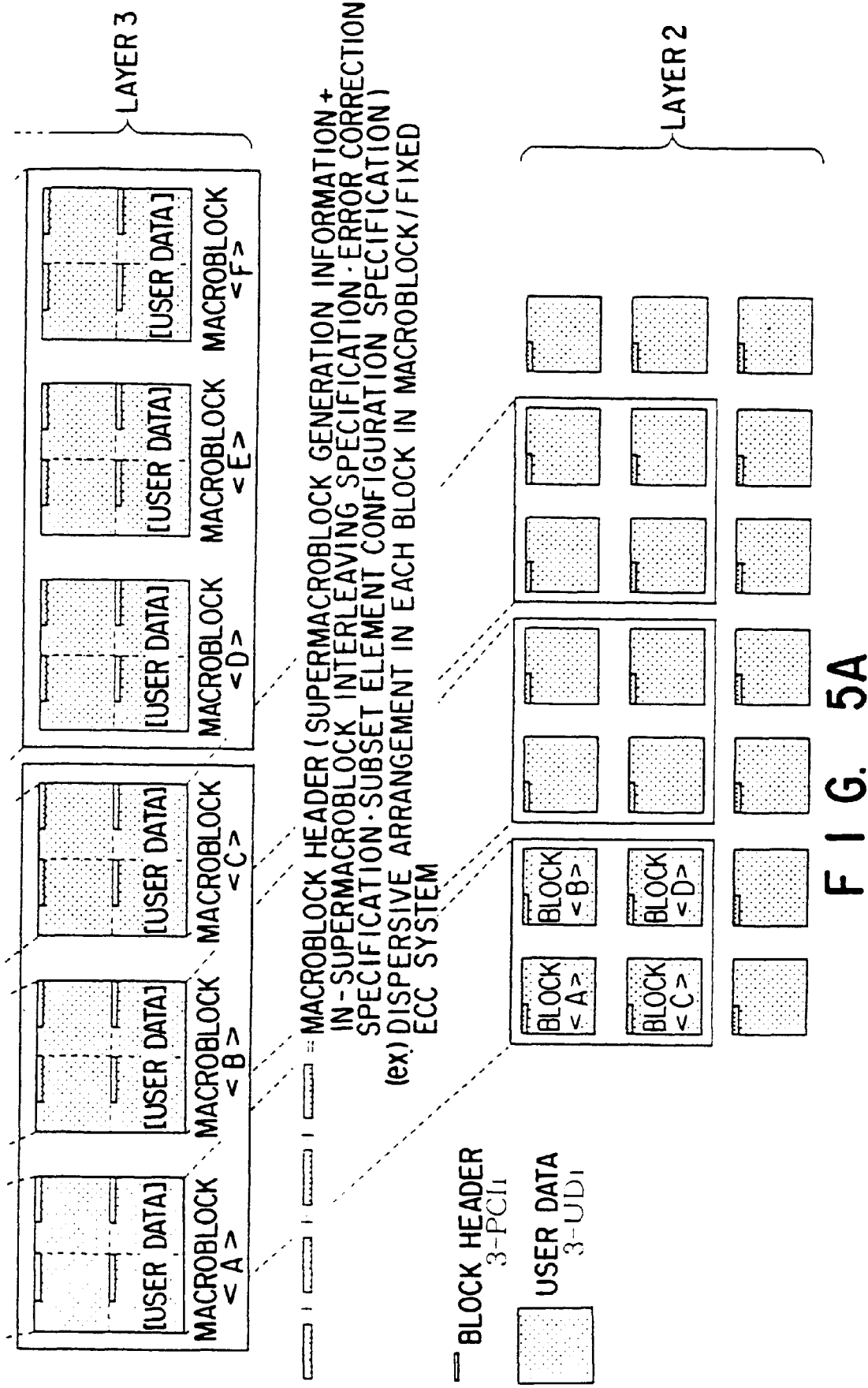
FIG. 5A is a view for explaining the function of portions of layers 2 and 3, FIG. 5B a view for explaining the function of layers 3 and 4 and FIG. 5C a view for explaining the function of layers 4 and 5.

That is, as shown in FIG. 5A, the layer 3 receives a bit data string (in the FIGURE, represented not by a one-dimensional array but by a two-dimensional array, that is, by a square array for ease in visual understanding) in block units of blocks <A>, <B>, <C>, . . . , recognizing a block header as a 3-PCI$_1$(second processing information) corresponding to given bits from a head of each block and subsequent user data as a 3-UD$_1$ and separating both from each other and linking together the blocks in accordance with the block header to create a macroblock. In FIG. 5A, one macroblock <A>is created with those four blocks (A) to (D).

The macroblock thus created comprises attached information (macroblock header, that is, one of second processing information) arranged in the corresponding macroblock in disperse form and data entity (user data).

In FIG. 5A, the information in the block header is no longer used (not referred to or eliminated) and, therefore, represented as an "open" mark (the respective "open" area in FIGS. 5B and 5C show the same meaning as represented above). That is, the processing information is incorporated in the user data in formal form of the header so as to be understood for the first time upon assembly in the next stage. At the stage of creating the macroblock, for example, it is not necessary to know the information of the macroblock by some means and all that is required is to receive from the block only the processing information which has only to structure the block and link it. Therefore, only the processing information is incorporated as information of how blocks can be linked to obtain a macroblock and subsequent processing information is incorporated in the user data. In other words, all the information (link information) necessary to link the block is regarded as the processing information and the sequential processing information is regarded as the user data and no read-in operation is carried out. If linking is effected as the macroblock, the processing information is discarded (this shows an "open" area). The processing information necessary for the next processing is read as the header information from the head of the user data, meaning that only the processing information required for the respective processing is read in.

Here, the macroblock header contains structured information (one of the second processing information) for creating (structuring) a supermacroblock through the linking of the macroblocks, information (third processing information) relating to interleave processing and error correction processing in a processing range not exceeding that in the supermacroblock, and: structure specification information (subset element header, that is, the third processing information) of the subset element. Out of these, at least information related to the interleave processing and error correction processing has an error correction capability independent of the user data entity.

The layer 3 has a function module (macroblock header unit deinterleaving/error correction module 50) reading out interleaving information from the macroblock header, deinterleaving the data of the macroblock in accordance with the information, reading out the error correction information from the macroblock header and error-correcting the user data subsequent to the deinterleave processing.

Further, the layer 3 has a function module (macroblock link (supermacroblock generation) module 52) reading out structured information for creating (structuring) a supermacroblock from the macroblock header and creating (structuring) the supermacroblock through the linking of a plurality of macroblocks.

That is, as shown in FIG. 5B, the linking of the macroblocks is achieved in accordance with the information written in the macroblock header to create a supermacroblock. In the FIGURE, one supermacroblock <A>is created with three macroblocks <A>to <C>.

The supermacroblock thus created comprises attached information (macroblock header) in a multiple dispersion array therein (For example, after linking as the macroblock headers, they exist in plural numbers in a multiple disperse array in the supermacroblock. That is, speaking reversely, one supermacroblock header is arranged in its form in three macroblocks (=multiple) and four portions are separately provided in the respective macroblocks (=dispersion)) and data entity (user data).

Here, the reason why the creation information (second processing information) of the supermacroblock and header information (third processing information) such as correction required to be processed in the supermacroblock unit, deinterleaving and subset element structured specification are arranged in plural macroblocks in multiplex way and in the interleaving, that is in the dispersive, way in one macroblock range is because the header information, in particular, the creation information of the supermacroblock can be reproduced necessarily as the data. That is, a paper sheet usually used as an information recording medium for recording a code pattern is not stable as in the case of a magnetic disc, etc. and, varying in paper quality and in its printing state, involves a high error occurrence. In this situation, for example, the link information and how to process the error correction and so on even in the case where the user data involves some error, are based on the recognition that, if data reproduction process fails, any subsequent processing is not effective and a multiple dispersive recording is done, that is, information is recorded in a double or a triple way. Further, even from the so implied meaning, it is defined that any independent correction can be written into the processing information.

The layer 3 has a function module (supermacroblock unit deinterleave module 54) reading out interleave information from the macroblock header and, in accordance with it, deinterleaving the supermacroblock user data and a function module (supermacroblock unit deinterleave module 56) reading out error correlation information from the macroblock header and, in accordance with it, effecting error correction of the user data subsequent to the deinterleave processing.

Further, the layer 3 includes a function module (subset element unit outing processing module 58) reading out subset element structure specification information, that is, a subset element header, from the macroblock header and, in accordance with it, separating the subset element from the user data of the supermacroblock after the above-mentioned error correction, a function module outputting the separated subset element unit, as a 3-SDU$_1$, to the adjacent upper layer, that is, the layer 4, and a function module allowing the receiving and delivering of the processing-related status information and control information.

That is, the layer 3 performs a multistage function of first connecting or linking blocks to generate a macroblock and linking it to the supermacroblock.

Here, the macroblock header of the macroblock thus created contains written specifications, that is, a specification of deinterleaving in the supermacroblock, an error correction specification (information showing in which size, on which system and to what extent the error correction should be effected in the supermacroblock) and a structure specification (information showing how the subset element is constructed and exists) of the subset element. Such macroblock headers are arranged in a dispersive array in one macroblock, that is, interleaved. Further, the error correction of a separate system is applied to the macroblock header and user data.

And the same macroblock header information is written in a plurality of macroblocks constituting one supermacroblock. That is, the information prepared through the linking of supermacroblocks and the specification of how interleaving is applied in the supermacroblock, etc., error correction specification, subset element structure specification, etc., are multiply written as the same contents in a given unit and arranged in a dispersive array in a small area.

Through the read-in of the macroblock header information (second processing information), the supermacroblock is first created through the linking of the macroblocks and, thereafter, through the read-in of the interleave specification from the information (third processing information) in the macroblock headers in a multiple array in the supermacroblock, the interleave specification is first read in and deinterleaving is applied in supermacroblock units. Thereafter, through the read-in of the error correction specification (it does not matter how the error correction unit is freely set) and, in accordance with it, the error correction is applied in the supermacroblock.

After the error correction processing is complete, the subset structure specification (third processing information) written in the macroblock header is read in and it is output in such a way as to divide the supermacroblock conceptually into data called subset elements. That is, as a 3-SDU$_1$, data is passed to the upper layer in subset element units.

The layer 4, that is, the presentation layer has a function module (sub-file link information reading-out module 60) receiving the subset element unit data (3-SDU$_1$), as a 4-PDU$_1$, from the adjacent lower layer, that is, the layer 3 and, from this, reading out the structured information (4-PCi$_1$, that is, the fourth processing information) and a function module (subset element link (subset generation) module 62) linking data entities (4-UD$_1$) of subset element units in accordance with the read-out structured information and creating (structuring) the subset. Here, the data in subset element units comprises structured information (subset element header) for linking the subset elements to create a subset and a user data entity.

Further, the layer 4 includes a function module reading out, from the created subset, attached information necessary in an existing or a new interface to the adjacent upper layer and effecting an interface matching, a function module outputting part or all the attached information of the subsets and data entity, as a 4-SDU$_1$, to the adjacent upper layer, that is, the layer 5, and a function module receiving and delivering processing-related status information and control information.

That is, the layer 4, receiving the data (for example, subset elements <A> and <B>) in the subset element unit from the layer 3, links the subset elements to provide one subset (for example, the subset <A>). In consequence, information (fourth processing information) of how the subset is created through the linking of the subset elements is entered as the subset element header in the subset element.

The linked subset contains written header information of the subset itself and user data. Since, in this case, the file is formed in a few combinations of subsets in the upper layer, the subset (for example, the subset <A>), headed upon their combination, contains written special header information for indicating it in particular.

It is to be noted that the subset means a mass of information convertible to information capable of recognizing only one subset as data by a human being, as set out above, even if it constitutes no file. That is, it is sound data if such is sound and it is all completed in the subset and can be brought back to sound in subset units. That is, even if it constitutes no file, it can be played back in such units.

Further, FIG. 5B shows an example in which three subsets can never be provided until two supermacroblocks are linked. In the case of, for example, a subset <B>, data may be set astride the two supermacroblocks <A> and <B>.

The layer 5, that is, the application layer, contains a function module (file management system module 64) receiving; the data (4-SDU$_1$) in the subset, as a 5-PDU$_1$, from the adjacent lower layer, that is, the layer 4, reading out file management information from the subset's attached information (5-PCI$_1$, that is, fifth processing information) or data entity (5-UD$_1$), making file management in accordance with the file management information, creating a file through the linking of the subset units or subsets, and reading out it in file units, a function module outputting, as the 5-SDU$_1$ to the application process, the data unit in subset units or in file units generated based on the file management, and a function module receiving or delivering the processing-related status information and control information.

That is, the layer 5 makes the file management. As the function of the file management it is possible to allow the subset to be merely passed or passed to the upper application process or it is possible for the layer 5 to create a file as shown in FIG. 5C. That is, the layer 5 performs the function of passing the data to the application process side in file units or in subset units.

Since, in a form actually connected to the file, the file is created with the subset linked thereto, it contains a file header, that is, the application control header, and the user data. In this case, the application control header contains information of what structure the user data possesses, user data expansion information, and so on.

Although, in the above-mentioned embodiment, the layer 3 has been explained as, subsequent to creating a macroblock once through the linking of blocks, creating a supermacroblock through the linking of such macroblocks, it may be possible to prepare a supermacroblock from blocks without creating any macroblocks.

Although the present invention has been explained based on the above-mentioned embodiment, it is not restricted to the above-mentioned embodiment and various modifications and their applications can be made without departing from the spirit and scope of the present invention. Here the essential features of the present invention can be summarized as follows:

(1) An information recording medium has an area recording, as an optically readable code pattern, multimedia information containing at least one of audio information, video information and digital code data, characterized in that
the code pattern contains processing information (header) necessary to subject the data to edit processing in accordance with a reproduction process (a reproduction function of realizing a logical layered structure) for reproducing original multimedia information by reading out the code pattern.

That is, it is possible to multiply select the processing methods or processing parameters by having, in a code pattern, processing information necessary to the reproduction processing.

Further, it is easier to, without being restricted to any specific processing method, add a method for performing suitable processing in accordance with the media or any excellent method produced in the future and to effect reproduction processing.

(2) The information recording medium as set out in (1) above is characterized in that the code pattern is arranged with data in each given unit grouped.

That is, by dealing with a mass of data structured in each given unit, processing is completed in its data mass unit and it is possible to perform independent processing. Since there is no need to structure all for processing to be carried out, so that a better processing efficiency can be obtained.

(3) The information recording medium as set out in (2) above is characterized in that the above-mentioned given unit is comprised of a block at least constituted by a data dot pattern having a plurality of dots arranged in accordance with the contents of the data and a marker having a pattern not possessed by the data dot pattern.

That is, since there is no common set between the data dot pattern and the marker pattern, it is easier to distinguish between both.

Further, the extraction of those data dot reading points through a marker standard can be effected more precisely and more easily than the method for extraction from the dots.

Further, it is easier to, through the marker, detect a given unit data area and to separate data belonging to the given unit.

Further, the order in which the data is read out can be defined by the marker, and any attached information relating thereto is not necessary.

(4) The information recording medium as set out in (1) above is characterized in that
the reproduction processing is layer-structured with a given number of layers (a logical multi-layered structure), and
the code pattern contains the processing information necessary for edit processing in the respective layer.

That is, since, through the layer-structure, the production processing is performed by the processing completed for each layer and layer-to-layer interface protocol, if the processing is forced to be partly modified, it is possible to achieve a layer change by simply observing they interface protocol between the corresponding layer and the adjacent layer, so that any adverse effect on the reproduction processing as a whole can be minimized.

Further, it is also possible to extract, from the code pattern, the edit processing information necessary for complete processing and to impart the flexibility to the function selection in the layer.

(5) The information recording medium as set out in (1) above is characterized in that the edit processing is made through the repeated gathering and dispersion of the data, in a structured fashion.

That is, the edit processing is so made that it is completed in given data unit through the proper gathering and dispersion of data. By doing so, the independence of the processing unit is created and the divide processing of the data is ensured and hence the efficiency of processing can be achieved.

Further, even in the case of a medium of a relatively small recording density, the divide processing can be suitably made so that the utilization efficiency of the recording capacity can be enhanced.

(6) The information recording medium as set out in (1) above is characterized in that
the reproduction processing is effected in a multi-stage way, and
the processing information necessary for the edit processing at each stage is arranged in a dispersive array in the code pattern.

That is, the burst error which is a major cause for degeneration of an error rate upon the reading of the edit processing information can be largely decreased by distributing the burst error as a code pattern in the dot pattern.

(7) The information recording medium as set out in (1) above is characterized in that
the reproduction processing is made in a multi-stage way, and
the processing information necessary for the edit processing at each stage is arranged in the above-mentioned code pattern in a dispersive and multiple way.

That is, the burst error which is a major cause for degeneration of the error rate upon the reading of the processing information most important to the edit processing is largely decreased and, further, the probabilistic decision of correct information can be made through the multiple array, so that the processing information free from any error is available.

(8) The information recording medium as set out in (6) or (7) above is characterized in that
the code pattern has data in each given unit arranged in a gathered way, and
the processing information necessary at the respective stage is arranged in each unit or set astride the respective units.

That is, the processing information is arranged on a structure commonly standardized in predetermined data units and the processing for extracting the processing information from the respective given unit data can be shared, thus reducing the processing involved.

Further, by preventing the processing information from being one-sidedly concentrated toward any specific processing unit data, any error of the reproduction processing in given data unit is prevented from propagating as an error on the processing information utilized at a later stage following the gathering of predetermined unit data.

(9) The information recording medium as set out in (8) above is characterized in that the above-mentioned given unit is comprised of a block at least constituted by a data dot pattern with a plurality of dots arranged in accordance with the content of data and a marker with a pattern not possessed by the data dot pattern.

That is, in addition to the advantages similar to those in (3) and (8) above, it is also possible to, since the processing information is allocated to a predetermined position of easily and precisely extractable given unit data, detect the dot pattern code with correctly processing information recorded thereon, so that the processing information can be extracted precisely.

(10) The information recording medium as set out in (1) above is characterized in that the above-mentioned edit processing includes an interleave processing, and the above-mentioned data processing information differ in an interleaving manner.

That is, by applying the interleaving system independent of the data to the processing information, it is possible to apply a simple and effective interleaving system to the processing information and to reduce the information associated with the interleaving of the processing information as well as the processing involved.

(11) The information recording medium as set out in (1) above is characterized in that the above-mentioned edit processing includes error detection or error correction processing, and the above-mentioned data and above-mentioned processing information differ in an error detection or an error correction processing manner.

That is, by applying the error detection/correction system independent of the data to the processing information, it is possible to apply a more effective error detection/collection system to the processing information and to augment the error correction power of the processing information of importance.

(12) An information recording medium having an area recording, as an optically readable code pattern, multimedia information containing at least one of audio information, video information and digital code data, characterized in that reproducing means, adapted to be applied to the information recording medium, for reading the code pattern and for reproducing it to original multimedia information, at least comprises:

first layer processing means (layer 1/physical layer) for converting the code pattern to code data as an image and delivering the information (resolution, image pickup range, code data representing formula, etc.) related to the read-out attached as first processing information (structured information (header)/2-$PCI_1$) to the code data;

second layer processing means (layer 2/block data layer) for recognizing (reading out) the first processing information delivered from the first layer processing means and processing the code data delivered from the first layer processing means and for creating a block gathered for each given unit and delivering an output;

third layer processing means (layer 3/data link layer) for allowing second processing information (block header/$3PCI_1$) at least necessary to form a supermacroblock of a greater given unit through the gathering of such blocks output from the second layer processing means to be extracted from the code data of the block, recognizing it and creating the supermacroblock based on the second processing information, for allowing third processing information (corresponding to information related to the interleave processing and error correction processing of the microblock header) for error handling-related processing to be extracted from the supermacroblock, recognizing it and performing processing related to the error handling of the supermacroblock on the third processing information, and for outputting a subset element through the dispersion of the supermacroblock on the basis of the third processing information; and fourth layer processing means (layer 4/presentation layer) for allowing fourth processing information (subset element header/4-$PCI_1$) at least necessary to create a subset comprised of a code of a given unit, from which the multimedia information is reproducible, to be extracted from the subset element which is delivered from the third layer processing means and outputting the subset created on the fourth processing information, and that the code pattern contains the above-mentioned second processing information, third processing information and fourth processing information.

That is, the first layer processing means has a function of creating digital image data of the optically read-out code pattern and delivering it together with data structure information. Through the use of the first processing information which is the structure information of the image data delivered, means for realizing the image data creating function can be freely structured and applied to a broader range of application.

Further, the second layer processing means creates a block of given unit data from the received image data and delivers block data after the block-related processing and, by doing so, completes its function. This function realizing means can be freely structured and has a broader range of application.

Further, the third layer processing means creates the supermacroblock through the extraction and recognition of the second processing information for creating the supermacroblock from the blocks and, therefore, is effective without the need to define the order of receiving the blocks, so that it ensures high flexibility. Further, it is also possible to, in the case of multiple inputs, effect proper selection of the blocks and to reduce the error rate. Further, the supermacroblock's size and structure and error-handling processing can be properly selected by the third processing information. The unit of the subset element can be properly selected by the third processing information.

Further, the fourth layer processing means extracts the fourth processing information from the subset element and, by doing so, creates a subset. It is, therefore, possible to provide a general-purpose subset creating structure. Further, it is also possible to effectively control the code pattern recording efficiency because an intermediate data unit (supermacroblock) necessary on a way to reproduction only and a unit (subset element) constituting final multimedia information can be handled as independent structures.

Further, the respective processing at the respective layer is managed/controlled by the processing information contained in the code pattern and the reading of the information can be ensured without depending upon the code pattern structure created upon recording. It also ensures a compatibility with a code pattern of different structure and allows a flexible handling.

(13) The information recording medium as set out in (12) is characterized in that the reproducing means further has fifth layer processing means (layer 5/application layer) for extracting, from the subset, fifth processing information (the subset's attached information/5-$PCI_1$) at least necessary to create the above-mentioned subset as a file corresponding to predetermined management information and outputting the file created on the basis of the fifth processing information, and the above-mentioned code pattern contains the above-mentioned fifth processing information.

That is, in the creation of the file through the structuring of the subset, the constituent information is obtained from the fifth processing information in the subset and the file structure can be built in a flexible way, so that the structuring of the application or its available range can be made extensive.

(14) An information reproducing apparatus comprises reproducing means for optically reading out a code pattern from an information recording medium having an area recording, as the optically readable code pattern, multimedia information containing at least one of audio information, video information and digital code data and reproducing the code pattern back to original multimedia information, characterized in that the reproducing means includes means for performing data processing based on processing information necessary to subject data to edit processing in accordance with a reproduction process contained in the code pattern.

That is, the processing information necessary to the reproduction process is possessed in the code pattern and it is possible to multiply select the processing methods or processing parameters.

That is, it is possible to provide an apparatus which can very easily perform reproduction processing while, without being restricted to any specific processing method, adding a suitable processing method corresponding to the media or any excellent method to be conceived in the future.

(15) The information reproducing apparatus as set out in (14) is characterized in that the code pattern has the data in each given unit arranged in a gathered way.

That is, since a mass of data structured in each given unit is handled there and processing is completed in a data mass unit and hence independent processing is possible, it is not necessary to structure the whole upon processing. It is, therefore, possible to provide an apparatus of better processing efficiency.

(16) An information reproducing apparatus as set out in (15) above is characterized in that the above-mentioned given unit is comprised of a block at least constituted by a data dot pattern with a plurality of dots arranged in accordance with the contents of the data and a marker having a pattern not possessed by the data dot pattern.

That is, since there are no common sets on the data dot pattern and marker pattern, it is possible to provide an apparatus which can very easily distinguish between the two.

It is also possible to provide an apparatus which, through the use of a marker standard, enables the extraction of reading-out points of the data dots to be more easily and precisely effected than the method for extracting them from the dots.

Further, since the order in which the data is read out is defined by the marker, an apparatus can be so made as to eliminate any attached information relating thereto.

(17) An information reproducing apparatus as set out in (14) above is characterized in that the reproduction process is structured with a predetermined number of layers, and the processing information necessary for the edit processing in each layer is contained in the code pattern.

That is, since, through the layered structure, the reproducing process can be defined by the process completed in each layer and layer-to-layer interface protocol, if the process is forced to be partly modified, it can be modified in the layer by simply observing the interface protocol on the layer and adjacent layer, so that the apparatus can minimize its influence from the whole reproduction process.

Further it is possible to provide an apparatus which can extract, from the code pattern, the edit processing information necessary for the completed process and can impart flexibility to the read-compatibility of the code pattern or the layer function selection.

(18) An information reproducing apparatus as set out in (14) above is characterized in that the edit processing is carried out through the repeated plural structural gathering/dispersion of the data.

That is, by properly gathering/dispersion the data so that the edit processing is completed in given data unit, an independent processing unit is created and it is, therefore, possible to process the data in divided way. It is thus possible to provide an apparatus which can achieve processing efficiency.

Further, even if the medium is relatively small in recording density, it is possible to provide properly divided processing units. By doing so, the apparatus can achieve the utilization percentage of the recording capacity.

(19) An information reproducing apparatus as set out in (14) above is characterized in that the reproduction process is performed in the multi-stage and the processing information necessary for edit processing in the respective layer is arranged in a dispersive way in the code pattern.

That is, any burst error which is a major cause for degeneration of an error rate at the reading of the edit processing information is dispersively arranged as a code pattern in the dot pattern and, by doing so, it 10 is possible for the apparatus to largely reduce such burst error.

(20) An information reproducing apparatus as set out in (14) above is characterized in that the reproduction process is performed in a multi-stageway, and the processing information necessary for the edit processing in the respective stage is arranged in the code pattern in a dispersive and multiple way.

That is, any burst error which is major cause for degeneration of an error rate at the reading of the edit processing information is dispersively arranged as a code pattern in the dot pattern and it is possible for the apparatus to largely reduce such burst error and the probabilistic decision of correct information can be made through the multiple layer structure. By doing so it is possible to provide an apparatus which can obtain processing information free from any error.

(21) An information reproducing apparatus as set out in (19) or (20) above is characterized in that the code pattern has data in each given unit arranged in a gathered way, and the processing information necessary in the respective stage is set in each unit or set astride the respective units.

That is, the processing information can be arranged with a structure defined in a given data unit and it is possible to share a process of extracting the processing information from each given unit data. This provides an apparatus which can reduce the processing.

Further, by preventing the processing information from being one-sidedly concentrated toward any specific processing unit data it is possible to prevent any error which is involved through the reproduction processing in a given data unit from propagating as an error on the processing information utilized at a later stage following the gathering of the predetermined unit data.

(22) An information reproducing apparatus as set out in (21) is characterized in that the given unit is comprised of a block at least constituted by a data dot pattern with a plurality of dots arranged in accordance with the content of data and a marker with a pattern not possessed by the data dot pattern.

That is, since, in addition to the same advantages as set out above, the processing information is allocated in a given position of a readily and precisely extractable given unit data, it is possible for the apparatus to detect the dot pattern code with correct processing information recorded thereon and, as a result, extract the processing information accurately.

(23) An information reproducing apparatus as set out in (14) is characterized in that
  the above-mentioned edit processing includes interleave processing, and
  the above-mentioned data and above-mentioned processing information differ in the way that each effects interleaving.

That is, by applying the interleaving system independent of the data to the processing information the apparatus can apply a simple and effective interleaving system to the processing information and reduce the information relating to the interleaving of the processing information and processing.

(24) The information reproducing apparatus as set out in (14) is characterized in that
  the above-mentioned edit processing includes error detection or error correction processing, and
  the above-mentioned data and processing information differ in an error detection or error correction processing manner.

That is, by applying the error detection/correction system independent of the data to the processing information the apparatus can apply more effective error detection/correction system to the processing information and strengthen the error correction capability of the processing information of importance.

(25) An information recording apparatus comprises reproducing means for optically reading out a code pattern from an information recording medium having an area recording, as the optically readable code pattern, multimedia information containing at least one of audio information, video information and digital code data and reproducing it back to original multimedia information, characterized in that
  the code pattern contains processing information necessary to subject data to edit processing in accordance with a reproduction process of reproducing the read-out code pattern back to the original multimedia information, and
  the reproducing means includes means for generating data of a second given unit (supermacroblock) by gathering, in predetermined numbers, data in each first given unit (block) corresponding to the read-out code pattern and structuring it based on the processing information.

That is, it is possible to generate the supermacroblock without depending upon the obtainment of the data of the block. It is, therefore, possible for the apparatus to read out the dot pattern in a free scanning direction.

Further, in the case where the data of the same block is obtained in a multiple way, it is possible for the apparatus to select a proper one depending upon an error state of the blocks and reduce such error.

In the case where the data of the same block is obtained in a multiple way, it is possible for the apparatus to make compensation, such as a replacement, depending upon an error state in a processing unit (demodulation unit) in the block and reduce such error.

(26) An information reproducing apparatus as set out in (25) is characterized in that the reproducing means includes means which, when the data of the second given unit (supermacroblock) is to be generated by collecting, in predetermined numbers, data in each first given unit (block) in accordance with the readout code pattern and structuring it based on the processing information, generates a third given unit (macroblock) by structuring the first given unit (block) and data in the second given unit (supermacroblock) by structuring the third given unit (macroblock).

That is, in order to generate the macroblock, the macroblock structuring information containing the block is less than the supermacroblock structuring information necessary to generate the supermacroblock and it is possible for the apparatus to lessen that totalized structuring information.

Further, it is possible for the apparatus to have, for each macroblock unit, the processing information necessary to the processing of the supermacroblock and to simply construct the arrangement/structuring of the processing information for the supermacroblock and readily provide a multiple structure.

(27) An information reproducing apparatus as set out in (25) or (26) is characterized in that it has means for generating data capable of reproducing one complete multimedia information comprised of a fourth given unit (subset element) by one to or more data of the above-mentioned second given unit (supermacroblock).

That is, the apparatus can effectively control the code pattern recording efficiency because an intermediate data unit (supermacroblock) necessary for the reproduction only and unit (subset element) constituting final multimedia information can be dealt with as independent structures.

(28) An information reproducing apparatus as set out in (25) or (26) or (27) is characterized in that the second given unit (supermacroblock) is matched in a data and/or processing information interleaving range.

That is, it is possible to variably realize the interleaving range. It is possible to set the interleaving range in accordance with an error generation state of the code pattern depending upon the state of the information recording medium and reduce that error rate.

(29) An information reproducing apparatus as set out in (25) or (26) or (27) is characterized in that the above-mentioned second given unit (supermacroblock) is greater than, or equal to, a data and/or processing information error detection or error correction range.

That is, since the error correction range can be varied with the supermacroblock range as a standard, it is possible to set a correction condition optimal to an error generation state of the code pattern depending upon the state of the information recording medium and reduce the error rate.

(30) An information reproducing apparatus comprises reproducing means for optically reading out a code pattern from a recording medium having an area recording, as the optically readable code pattern, multimedia information containing at least one of audio information, video information and digital code data and producing it back to original multimedia information, characterized in that
  the reproducing means includes means for extracting processing information necessary to subject data to edit processing in accordance with the reproduction process at multiple stages from that data from the previous stage.

That is, since the processing information necessary for a process involved has only to be extracted from previous data, it is only necessary to know an array structure such as the occupying position, etc., of processing information necessary to obtain requisite minimal processing information in the data. The structural information is also known to a necessary minimal extent. The apparatus thus obtained is excellent in processing efficiency.

(31) An information reproducing apparatus as set out in (30) is characterized in that it further comprises means for eliminating that processing information not required after being used at the edit processing at a stage involved.

That is, since the processing information not required after being processed is eliminated, an amount of data involved is decreased with the progress of the processing. It is, therefore, possible for the apparatus to achieve a saving in a memory, etc., required for the processing.

(32) An information reproducing apparatus comprises reading-out means for optically reading out a code pattern from a recording medium having an area recording, as the optically readable code pattern, multimedia information containing at least one of audio information, video information and digital code data, reproducing means for reproducing the code which is read out by the reading-out means back to original multimedia information, and outputting means for outputting the multimedia information reproduced by the reproducing means, characterized in that the reproducing means comprises:

first layer processing means for converting the read-out code pattern to code data as an image and for delivering an output with information (image resolution, image pickup range, representation format, etc., of the code data) related to the read-out attached as first processing information to the code data;

second layer processing means for recognizing (reading out) the first processing information delivered from the first layer processing means and processing the code data delivered from the first layer processing means and for creating a block with the code data gathered for each given unit and for delivering an output;

third layer processing means for allowing second processing information at least necessary to form a supermacroblock of a greater given unit through the gathering of such blocks output from the second layer processing means to be extracted from the code data of the block, recognizing the second processing information and creating the supermacroblock based on the second processing information, for allowing third processing information for error handling-related processing to be extracted from the supermacroblock, recognizing the third processing information and performing processing related to the error handling of the supermacroblock on the basis of the third processing information, and for outputting a subset element created through the dispersion of the supermacroblocks on the basis of the third processing information; and fourth layer processing means for allowing fourth processing information at least necessary to create a subset comprised of a code of a given unit, from which the multimedia information is reproducible, to be extracted from the subset element which is delivered from the third layer processing means and for outputting the subset created on the basis of the fourth processing information.

That is, the first layer processing means has the function of creating a digital image of the optically read-out code pattern and outputting it together with the data structure information. By the first processing information which is structure information of the output image data, it is possible for the apparatus to freely structure a realizing means of the generation function of the image data and achieve a high general-purpose unit.

Further, the second layer processing means completes the function of generating a block of given unit data from the input image data and outputting block data after processing related on the block and it is possible to freely structure the realizing of its function and achieve a high general-purpose unit.

Further, the third layer processing means extracts/recognizes the second processing information for creating a supermacroblock from blocks, so that it obviates the necessity to define the order in which the blocks are obtained. It is possible to provide a highly flexible apparatus. Further, it is possible to select a proper one from those multiply input blocks and reduce the error rate. The apparatus thus provided can freely select the size, structure and error handling of the supermacroblock by the third processing information. It is possible for the apparatus to freely select the unit of the subset element and the array and structure of the supermacroblock by the third processing information.

Further, the fourth layer processing means extracts the fourth processing information from the subset element and, by doing so, creates the subset. It is, therefore, possible to provide a general-purpose subset structure. Since an intermediate data unit (supermacroblock) necessary on a way to reproduction only and final multimedia information constituting unit (subset element) can be handled as independent structures, it is possible to provide an apparatus which can effectively control the code pattern recording efficiency.

Further, the respective processings of the respective layers are managed/controlled by the processing information in the code pattern and the reading-out of the information can be effected without depending upon a code pattern structure generated upon recording. It is possible for the apparatus to maintain compatibility even with the code pattern of different structure and ensure flexible handling.

(33) An information reproducing apparatus as set out in (32) is characterized in that the above-mentioned reproducing means further includes fifth layer processing means for extracting, from the above-mentioned subset, fifth processing information at least necessary to generate the above-mentioned subset as a file corresponding to given management information and outputting the film generated based on the fifth processing information.

That is, since, upon generating a file through the generation of the subset, constituent information is obtained from the fifth processing information in the subset, it is possible for the apparatus to build the file structure flexibly and obtain a very broad available application.

As set out in more detail, according to the present invention, an information recording medium and information reproducing apparatus are provided which, even if the structure of a code pattern per se varies in the future, can cope with this situation.

What is claimed is:

1. An information recording medium having an area recording, as an optically readable code pattern, multimedia information containing at least one of audio information, video information and digital code data, wherein the code pattern contains structuring information as to how to link data of a first predetermined unit, so as to structure data of a second predetermined unit, as processing information necessary for data editing process in accordance with a reproduction process for reproducing original multimedia information from a read code pattern.

2. An information recording medium according to claim 1, wherein the code pattern consists of data of each of the predetermined units gathered in an arrangement.

3. An information recording medium according to claim 2, wherein each predetermined unit is a block comprising a data dot pattern made of a plurality of dots arranged in accordance with the contents of data, and a marker having a pattern which is impossible as the data dot pattern.

4. An information recording medium according to claim 2, wherein the reproducing process is layered-structured to have a predetermined number of layer structures, and the code pattern contains the structuring information necessary to link data in the layer structures.

5. An information recording medium according to claim 1, wherein the reproducing process is carried out in multi-stages, and the structuring information necessary to link data in the multi-stages are arranged within the code pattern in a dispersed manner.

6. An information recording medium according to claim 5, wherein the code pattern consists of data of each of the predetermined units gathered in an arrangement, and the structuring information necessary to link data in the multi-stages is arranged in each of the units or over the units.

7. An information recording medium according to claim 6, wherein each predetermined unit is a block comprising a data dot pattern made of a plurality of dots arranged in accordance with the contents of data, and a marker having a pattern which is impossible as the data dot pattern.

8. An information recording medium according to claim 1, wherein the reproducing process is carried out in multi-stages, and the structuring information necessary to link data in the multi-stages is arranged within the code pattern in a dispersed and multiple manner.

9. An information recording medium according to claim 8, wherein the code pattern consists of data of each of the predetermined units gathered in an arrangement, and the structuring information necessary to link data in the multi-stages is arranged in each of the units or over the units.

10. An information reproduction apparatus comprising reproduction means for reproducing original multimedia information from a code pattern optically read from a recording medium having an area recording, as an optically readable code pattern, multimedia information containing at least one of audio information, video information and digital code data, wherein the code pattern contains structuring information as to how to link data of a first predetermined unit, so as to structure data of a second predetermined unit, as processing information necessary for data editing process in accordance with a reproduction process for reproducing original multimedia information from the read code pattern, and the reproduction means includes means for processing data on a basis of the structuring information contained in the code pattern.

11. An information reproduction apparatus according to claim 10 wherein the code pattern consists of data of each of the predetermined units gathered in an arrangement.

12. An information reproduction apparatus according to claim 11, wherein each predetermined unit is a block comprising a data dot pattern made of a plurality of dots arranged in accordance with the contents of data, and a marker having a pattern which is impossible as the data dot pattern.

13. An information reproduction apparatus according to claim 10, wherein the reproducing process is layered-structured to have a predetermined number of layer structures, and the code pattern contains the structuring information necessary to link data in the layer structures.

14. An information reproduction apparatus according to claim 10, wherein the reproducing process is carried out in multi-stages, and the structuring information necessary to link data in the multi-stages are arranged within the code pattern in a dispersed manner.

15. An information reproduction apparatus according to claim 14, wherein the code pattern consists of data of each of the predetermined units gathered in an arrangement, and the structuring information necessary to link data in the multi-stages is arranged in each of the units or over the units.

16. An information reproduction apparatus according to claim 15, wherein each predetermined unit is a block comprising a data dot pattern made of a plurality of dots arranged in accordance with the contents of data, and a marker having a pattern which is impossible as the data dot pattern.

17. An information reproduction apparatus according to claim 15, wherein the code pattern consists of data of each of the predetermined units gathered in an arrangement, and the structuring information necessary to link data in the multi-stages is arranged in each of the units or over the units.

18. An information reproduction apparatus according to claim 10, wherein the reproducing process is carried out in multi-stages, and the structuring information necessary to link data in the multi-stages is arranged within the code pattern in a dispersed and multiple manner.

* * * * *

UNITED STATES PATENT AND TRADEMARK OFFICE
CERTIFICATE OF CORRECTION

PATENT NO.      : 6,543,697 B1
DATED           : April 8, 2003
INVENTOR(S)     : Shinichi Imade It is certified that error appears in the above-identified patent and that said Letters Patent is hereby corrected as shown below:

<u>Title page,</u>
Item [75], Inventors, delete "Yutaka Yunoki, Kunitachi (JP) ;"; and
Item [57], ABSTRACT,
Line 2, before "code", insert -- a --.

Signed and Sealed this

Sixteenth Day of September, 2003

JAMES E. ROGAN
*Director of the United States Patent and Trademark Office*